United States Patent [19]
Huong

[11] Patent Number: 5,151,067
[45] Date of Patent: Sep. 29, 1992

[54] VEHICLE AUTOMATIC TRANSMISSION SYSTEM

[76] Inventor: Chin-Fu Huong, No. 14-4, Lane 263, Sec. 2, Wen Hwa Rd., Panchiao, Taipei, Taiwan

[21] Appl. No.: 699,173

[22] Filed: May 13, 1991

Related U.S. Application Data

[63] Continuation-in-part of Ser. No. 426,885, Oct. 25, 1989, abandoned.

[51] Int. Cl.⁵ ............................................. F16H 47/08
[52] U.S. Cl. ....................................... 475/43; 475/51; 475/52; 475/56; 475/218; 475/259; 475/262; 192/3.26
[58] Field of Search ............. 475/35, 43, 47, 51, 475/52, 56, 258-263, 267, 329, 207, 208, 218, 293, 302, 312, 314, 315; 192/3.25, 3.26, 3.27

[56] References Cited

U.S. PATENT DOCUMENTS

| | | | |
|---|---|---|---|
| 2,466,206 | 4/1949 | Carnagwa | 475/43 |
| 3,191,459 | 6/1965 | Welch | 475/51 |
| 3,374,692 | 3/1968 | Kitch et al. | 475/47 |
| 3,699,826 | 10/1972 | Lamb | 475/262 |
| 4,474,079 | 10/1984 | Crockett | 475/52 X |
| 4,592,250 | 6/1986 | Plasencia et al. | 475/51 |
| 4,627,308 | 12/1986 | Morato et al. | 475/205 X |

FOREIGN PATENT DOCUMENTS

| | | | |
|---|---|---|---|
| 56-49446 | 5/1981 | Japan | 475/260 |
| 61-252936 | 11/1986 | Japan | 475/208 |

Primary Examiner—Richard Lorence
Assistant Examiner—Benjamin Levi
Attorney, Agent, or Firm—Buckman and Archer

[57] ABSTRACT

A fully automatic transmission system for a vehicle eliminates the use of hydraulic or electromagnetic valves to control speed change, and instead utilizes clutches to change shift and disconnect power transmission, to minimize power consumption during idle shift, and to prevent slipping of the vehicle during climb on an upgrade, respectively, when no power is transmitted to the vehicle wheels, and without the need to brake the vehicle. When the revolving speed of the vehicle engine is slower that that of the transmission shaft, idle rotation of the system's clutch lining connector is automatically prevented.

3 Claims, 8 Drawing Sheets

5,151,067

VEHICLE AUTOMATIC TRANSMISSION SYSTEM

REFERENCE TO PRIOR APPLICATIONS

This is a continuation-in-part of prior application Ser. No. 07/426,885, now abandoned filed on Oct. 25, 1989.

BACKGROUND OF THE INVENTION

The invention of the automobile is one of the milestones in human history, since it helps people to travel faster along streets or roads. The automobile industry is very important to a developing or developed country, since it provides hundreds thousand's of job opportunities, and helps in the development of a variety of satellite industries.

In regular or standard automobiles, a shift change during power transmission is generally made through manual operation or automatic control. Conventionally, manual shift control is generally achieved through the operation of a clutch, while automatic shift control is directly operated through a transmission gear. As automatic shift control is very convenient to operate, and very helpful in an area with heavy traffic, it is commonly accepted by ordinary people. However, an automatic shift car may slip slowly during the forward shift, when the accelerator is not stepped upon, unless the automatic shift is returned to the idling position; an automatic shift car is prone to slip downwardly when the engine is stopped during climbing on an upgrade.

Under these circumstances, the driver needs to step on the brake, or pull up the hand brake. It is therefore the main object of the present invention to solve this problem.

DETAILED DESCRIPTION OF THE PREFERRED EMBODIMENTS

Figure 1:
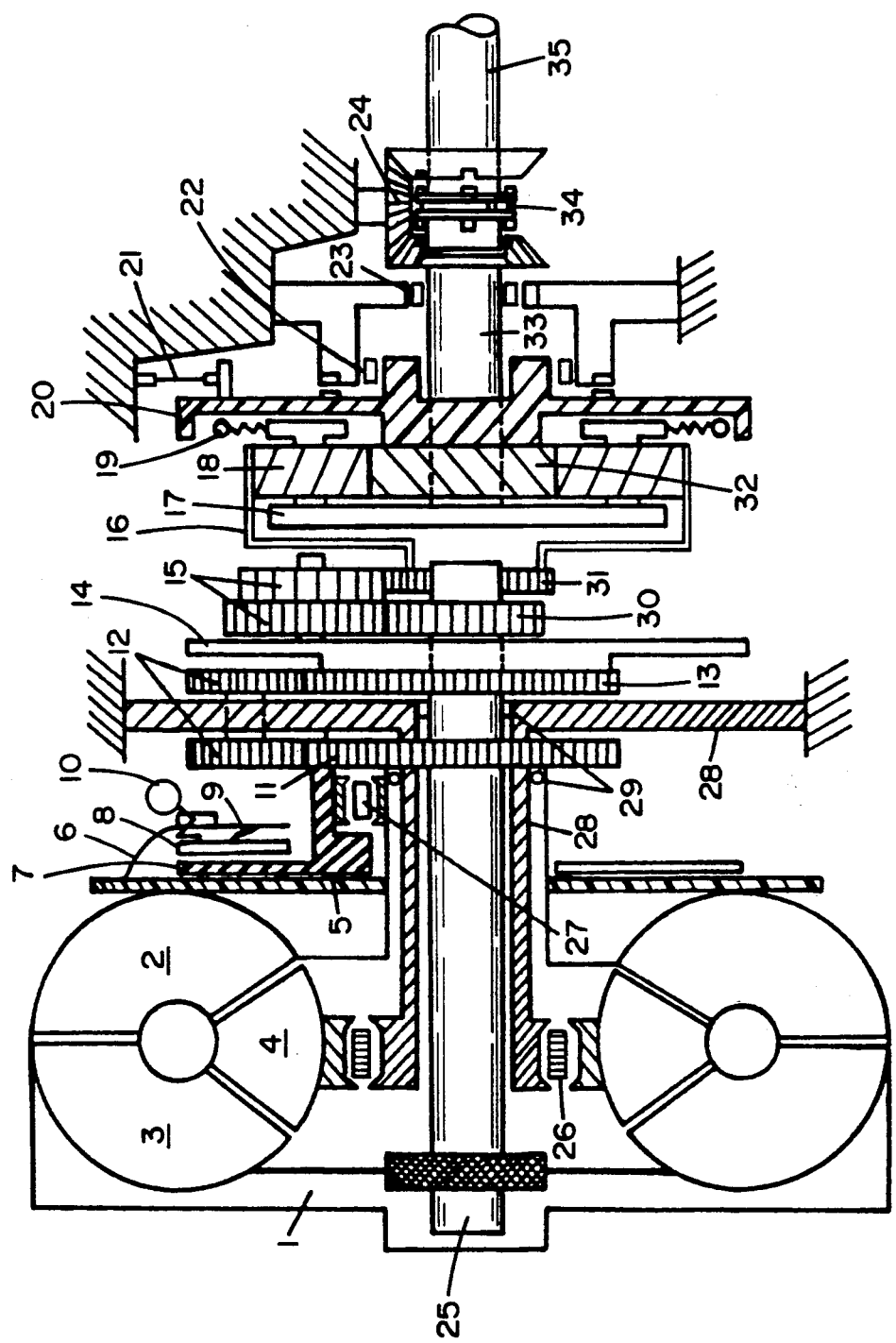
FIG. 1 shows a schematic sectional view of an automatic transmission embodying the present invention.

Turning now to the annexed drawings, there is illustrated therein in detail an automatic transmission embodying the present invention, and generally including a torque converter 1, having mounted thereon a drive vane 2 connected with a driven vane 3 to convert a torque force during idle rotation, and a stator 4 to control the direction of fuel flow.

At the back side of the torque converter 1, there are set, in serial order, a clutch pressure bearing plate 5, a clutch cover 6, a clutch lining connector 7, a clutch pressure plate 8, a clutch spring 9, and a centrifugal weight 10. When the engine revolutions reach a predetermined range, the centrifugal weight 10 urges the clutch lining connector 7 to make contact with the clutch pressure bearing plate 5 through the clutch pressure plate 8, so that engine power is connected. When the urging force is released from the clutch pressure plate 8, the clutch spring 9 is separated from the clutch lining connector 7.

A clutch gear 11 is connected to the clutch lining connector 7, and is engaged with a junction gear 12, which, in turn, is engaged with a transmission gear 13. The transmission gear 13 is pivoted to a first annulus seat 14, which has pivoted thereto a spin gear 15 rotating on its own axis.

A ring gear 16 of a second annulus is mounted on a second annulus seat 17, and is engaged with a reducing gear 31 to receive power transmission. The second annulus seat 17 has pivoted thereto a planetary gear 18 of the second annulus, and a centrifugal clutch lining 19. When the revolving speed of the second annulus seat 17 reaches a predetermined range, the clutch lining 19 locks up with a drivable drum wheel 20 set in series therewith at the back, so that the whole second annulus is driven to rotate in its entirety.

The drivable drum wheel 20 is controlled by a return rod 21, which urges the drivable drum wheel 20 to return to its original position, when the axial urging force is released therefrom. The drivable drum wheel 20 is simultaneously controlled by a one-way drum wheel clutch 22 to revolve in a direction equal to that the vehicle engine.

A one-way output clutch 23 surrounds a front output shaft 33 so as to control the latter to follow the vehicle engine to revolve in the same direction. A shifting gear 34 is pivoted to the front output shaft 33, and a reverse idle gear 24 is connected thereto for reverse shift. The power from the front output shaft 33 is further transmitted through the shifting gear 34 or through the reverse idle gear 24 to a rear output shaft 35 for final power output.

As illustrated in FIG. 1, when the driven vane 3 is driven to operate downstream of the torque output shaft 25, a one-way stator clutch 26 is provided to control the direction of the stator 4. The torque output shaft 25 is controlled by a one-way brake clutch 27 so as to allow the clutch lining connector 7 to carry the vehicle engine, when the revolving speed of the vehicle engine is slower that that of the clutch lining 7, so as in turn to produce an auxiliary braking effect. The one-way stator clutch 26 is fixedly mounted on a stator axle housing 28, which has an oil seal 29 mounted thereon.

A torque gear 30 is coupled with the torque output shaft 25, and is engaged with the ring gear 16, which in turn engages the gear 31, so as to transfer power to the second annulus when power is reduced through the first annulus. A sun gear 32 of the second annulus is engaged with the planetary gear 18 of the second annulus, and coupled with the driven drum wheel 20. The power which is reduced through the second annulus seat 17 is transmitted through the front output shaft 33 of the shifting gear 34. The shifting gear 34 slides along the rear output shaft 35 so as to control forward shifting, idle shifting, and reverse shifting. It will thus be seen that the first annulus includes the annulus seat 14, the spin gear 15, the torque gear 30, and the gear 31, while the second annulus includes the ring gear 16, the annulus seat 17, the planetary gear 18, the centrifugal clutch lining 19, the drum 20, and the sun gear 21.

Figure 2:
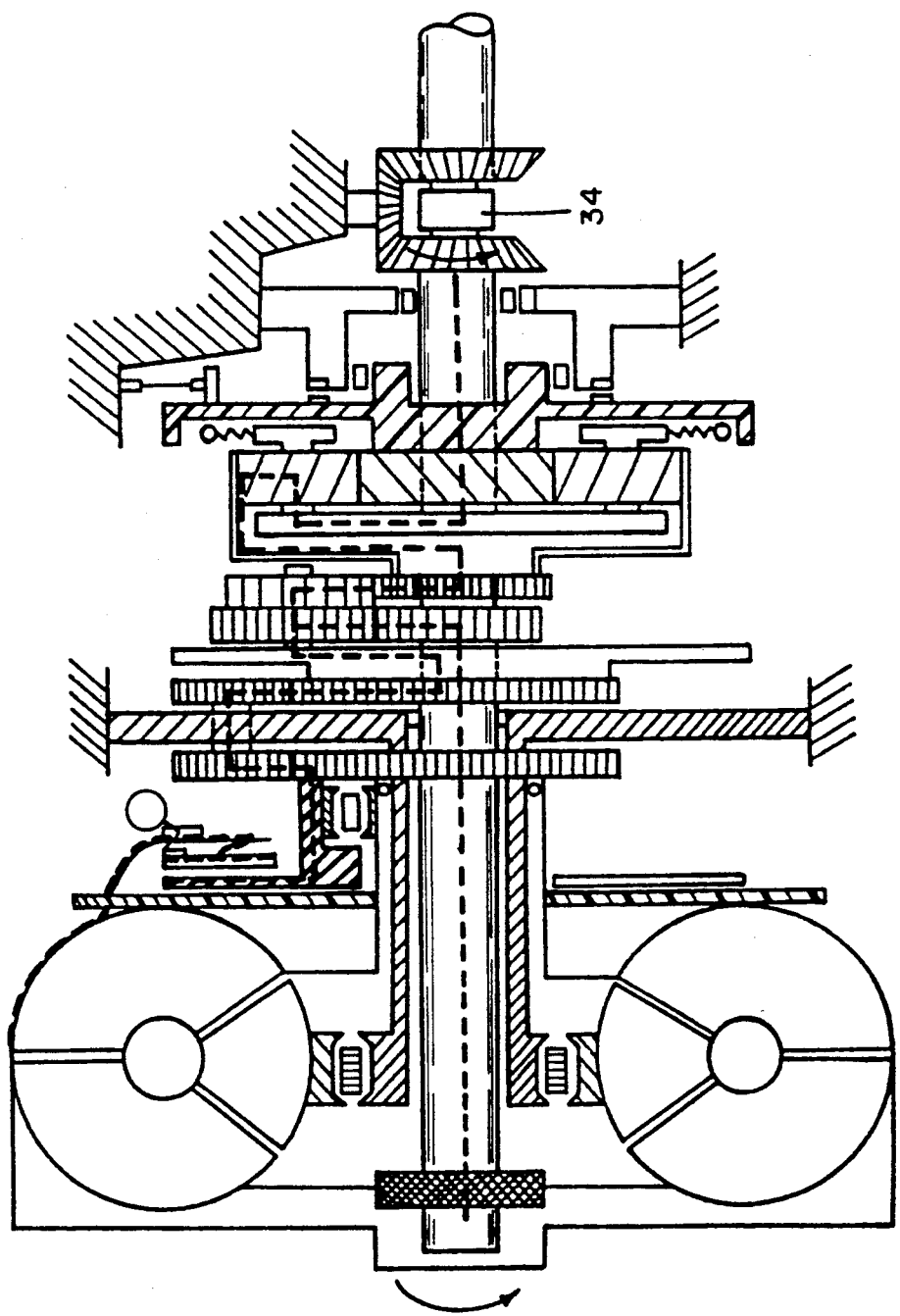
FIG. 2 shows a schematic drawing illustrating the operation of the present invention in an idle shift mode.

The operation of the present invention is outlined hereinafter. FIG. 2 illustrates the operation of the present invention in an idle shift mode, wherein the dotted line herein and in subsequent Figures indicates direction of power transmission during forward rotation of the vehicle engine. The power from the torque converter 1 is transmitted through the clutch pressure bearing plate 5 and the clutch cover 6. Because the centrifugal force in the aforementioned idle shift mode still does not reach the standard range to drive the clutch lining connector 7, the power transmission is interrupted, i.e. prevented from progressing further downstream. Although the torque force from the driven vane 3 is still applied to the torque gear 30, the torque gear 30 nevertheless remains immovable, since the clutch lining connector 7 is driven so as to rotate in an opposite direction, i.e. so as to interrupt the power transmission.

Figure 3:
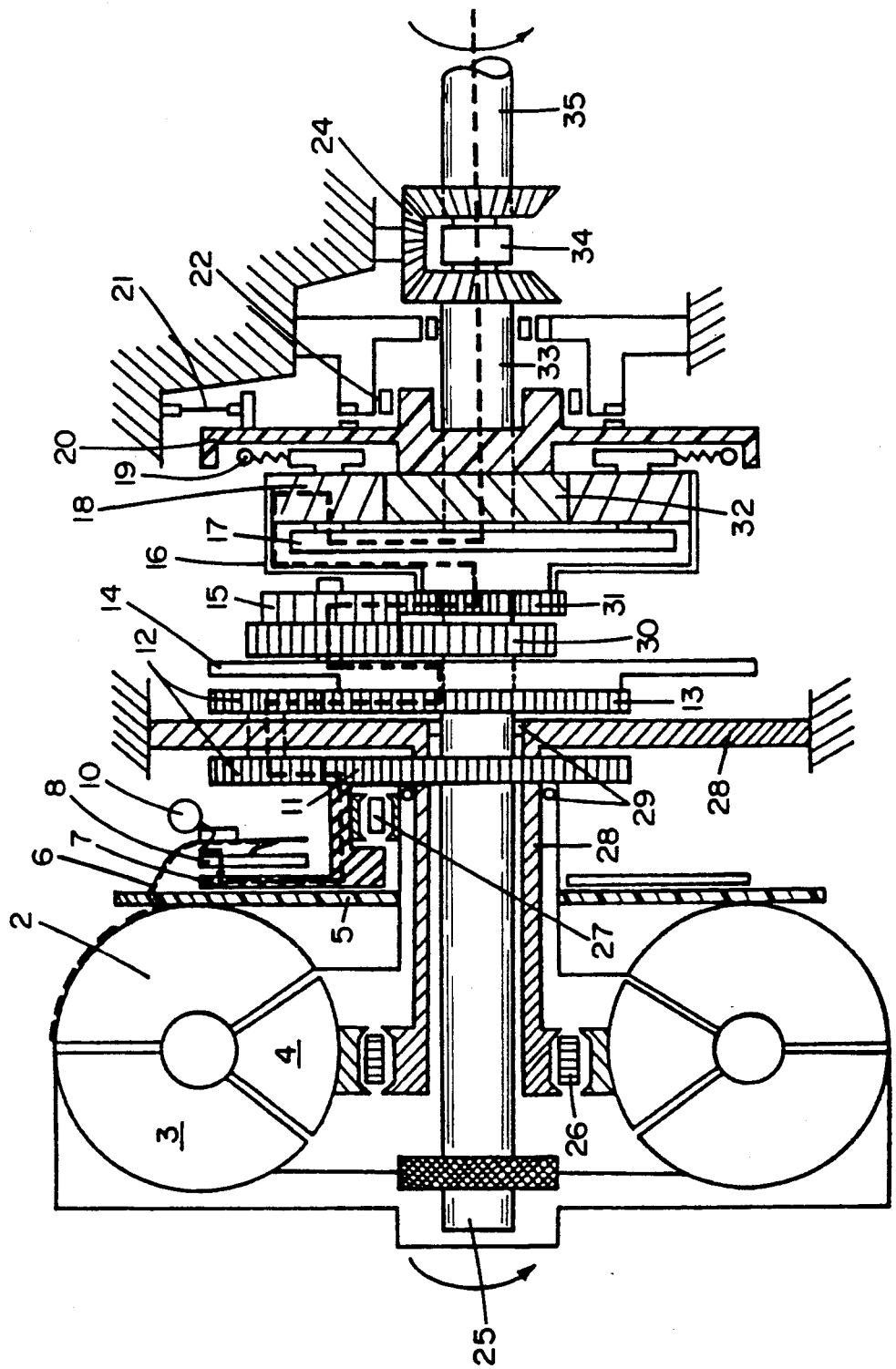
FIG. 3 shows a schematic drawing illustrating the operation of the present invention in a slow shift mode.

FIG. 3 illustrates the operation of the present invention in a slow shift mode. During forward shift the accelerator is slightly stepped upon so as to drive the centrifugal weight 10 into operation, and the clutch pressure plate 8 is urged toward the clutch lining connector 7 so as to transmit the power through the clutch gear 11, the junction gear 12, the transmission gear 13, the first annulus seat 14 and the spin gear 15 for a first speed reducing process. The power, following the first speed reducing process, is then transmitted to the second annulus of the ring gear 16, the planetary gear 18, and the second annulus seat 17, for a second speed reducing process Because the sun gear 32 may rotate in an opposite direction to neutralize power output, the one-way drum wheel clutch 22 is therefore utilized to control the direction of revolution of the sun gear 32 to obtain the power output. The power is further transmitted through the front output shaft 33, and the shifting gear 34 to the rear output shaft for final power output.

Figure 4:
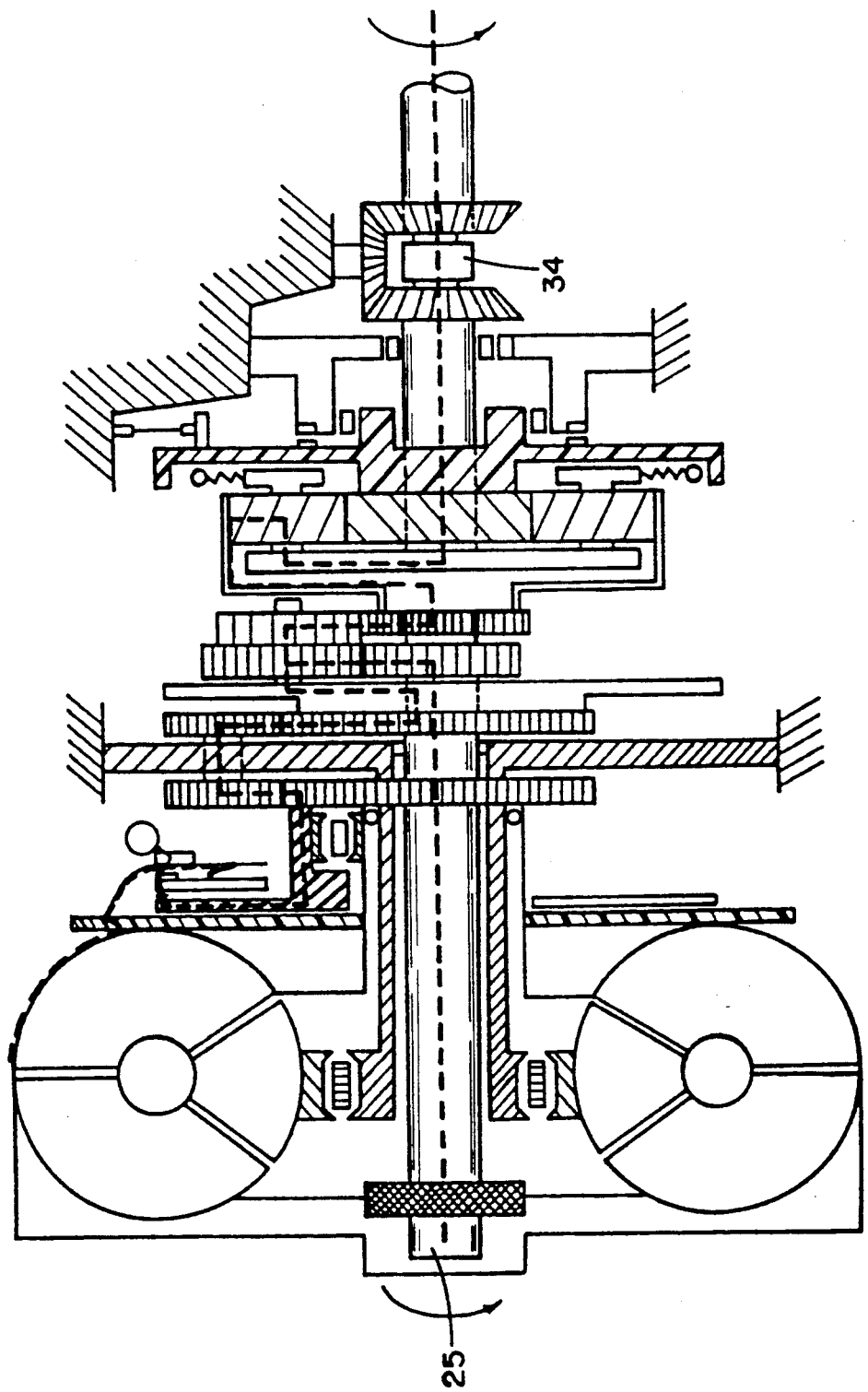
FIG. 4 shows a schematic drawing illustrating the operation of the present invention in an intermediate shift mode.

FIG. 4 illustrates the operation of the present invention in an intermediate shift mode. When the revolving speed of the vehicle engine is increasing through the operation of the accelerator of the vehicle, the torque from the torque output shaft 25 is simultaneously increasing therewith also. The speed reducing ratio is automatically adjusted according to the load and the strength of the torque obtained from the vehicle engine. From the slow shift mode to the intermediate shift mode, the automatic speed change is achieved through torque force conversion. As soon as the speed difference between the drive vane 2 and the driven vane 3 reaches zero, or is close to zero, no torque exists between vanes 2 and 3, and the transmission speed of members 14, 25, 30 and 31 will be the same, i.e. the shift change is concluded. In this condition, the first annulus transmits engine power at a ratio of one to one, but the power output from the first annulus is reduced once through the second annulus.

Figure 5:
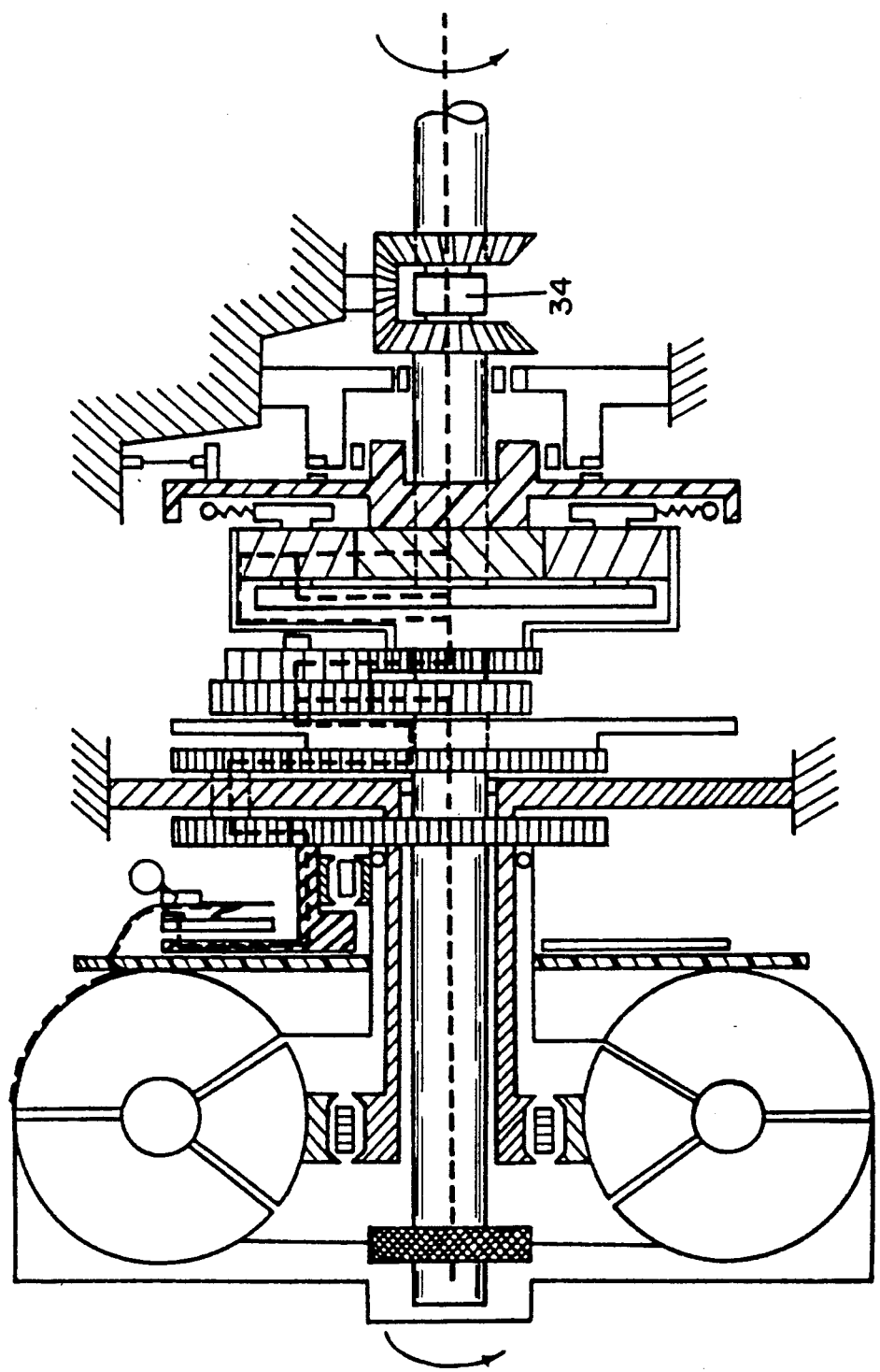
FIG. 5 shows a schematic drawing illustrating the operation of the present invention in a fast shift mode.

FIG. 5 illustrates the operation of the present invention in a fast shift mode. When the vehicle reaches a predetermined speed, the centrifugal clutch lining 19 of the second annulus seat 17, which is then coupled with the front output shaft 33, drives the driven drum wheel 20, with which it is then in coupling engagement, so as to rotate it. Under this condition, the second annulus is locked up to transmit the power from the first annulus at a ratio of one to one, i.e. the final power output is equal to the engine power.

Figure 6:
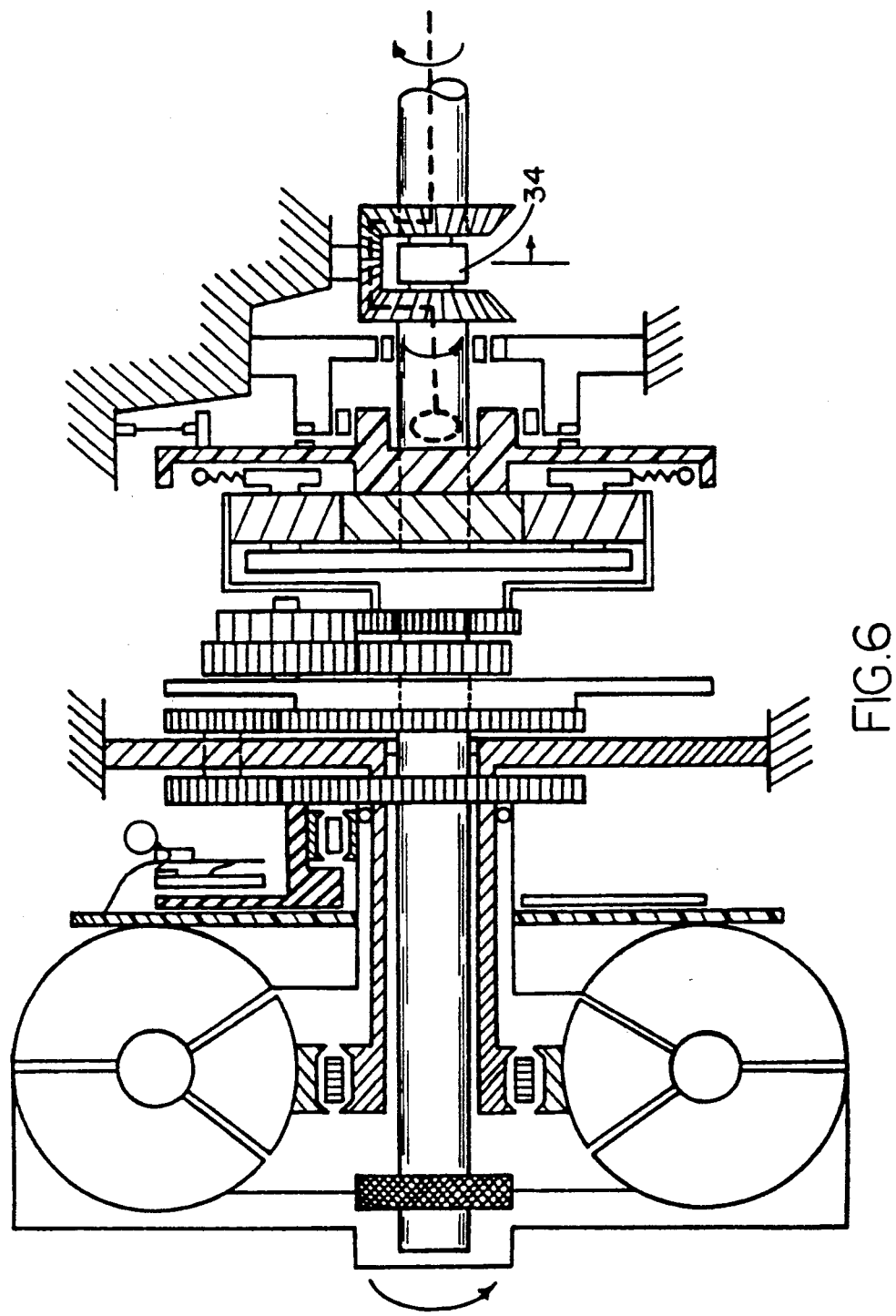
FIG. 6 shows a schematic drawing illustrating the operation of the present invention in a reverse shift mode.

FIG. 6 illustrates the operation of the present invention in a reverse shift mode. When the shifting gear 34 is shifted to reverse shift, the rear output shaft 35 is driven to rotate in an opposite direction to drive the vehicle to move backwards. When the vehicle comes to a halt during climbing on an upgrade in the forward shift mode, the vehicle may slip backwards, since the engine power is prevented from being transmitted to the vehicle wheels. Under this condition, the one-way output clutch 23 controls the revolving direction of the front output shaft 33 to protect the vehicle from slipping backwards. During reverse shift, the revolving direction of the rear output shaft 35 is changed, while the front output shaft 33 remains unchanged, and therefore the vehicle is prevented from moving forward.

It will be understood that the expressions "slow, intermediate, and fast shift modes" denote ranges of speed in the respective mode, and not respective specific speeds.

Figure 7:
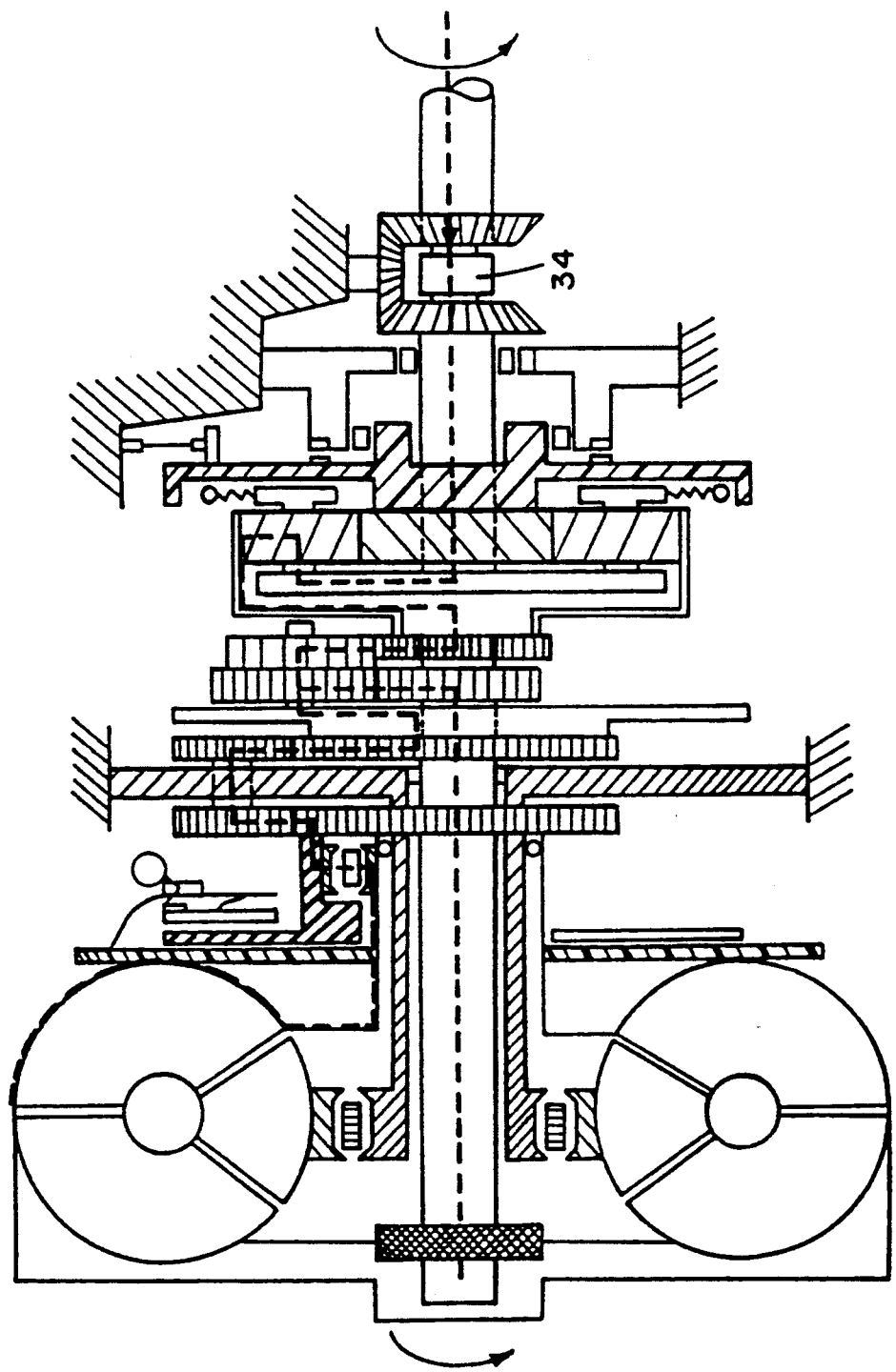
FIG. 7 shows a schematic drawing illustrating the operation of the present invention as an auxiliary braking mechanism.
Figure 8:
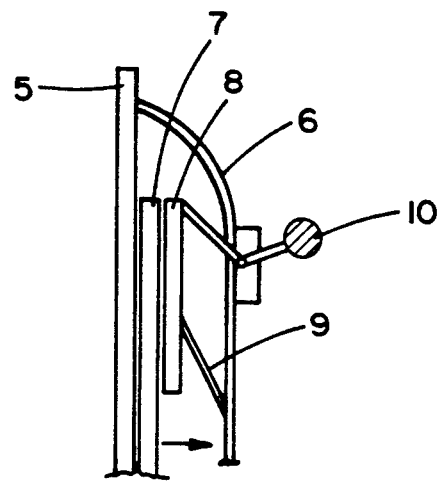
FIG. 8 shows the position of the clutch bearing, pressure plate, clutch lining connector, the centrifugal weight, and the clutch pressure plate in the idle shift mode.
Figure 9:
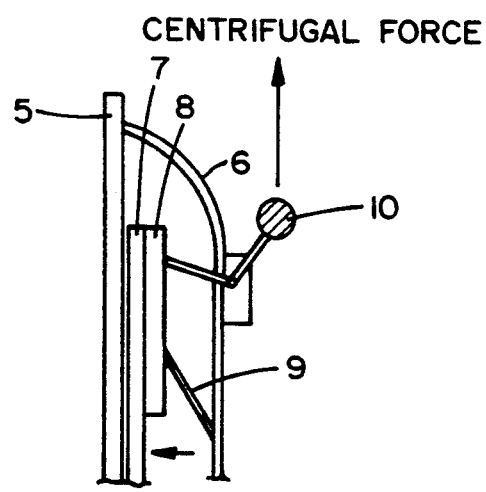
FIG. 9 shows the position of the clutch bearing, pressure plate, clutch lining connector, the centrifugal weight, and the clutch pressure plate in the forward shift modes.

FIG. 7 illustrates the operation of the present invention when serving as an auxiliary brake to brake the vehicle engine during drive on a downgrade. When the vehicle is slipping forward, the vehicle engine is revolving idly, and the slipping speed will drive the front output shaft 33 so as to rotate it. If the revolving speed of the front output shaft 33 exceeds that of the vehicle engine, the driven drum wheel 20 will produce an axial urging force, due to the effect of the second annulus, and will be pushed towards the power output direction so as to lock up. The front output shaft 33 and the ring gear 16 of the second annulus will then produce a speed ratio equal to the intermediate speed shift of the present invention. The one-way brake clutch 27 secures the clutch lining connector 7 so as to carry the vehicle engine, and so as to prevent idle rotation of the clutch lining connector 7. If the revolving speed of the vehicle engine is accelerated to exceed that of the front output shaft 33, the axial urging force is driven to operate in an opposite direction, and the return rod 21 urges the driven drum wheel 20 to return to its original position. Thus the operation returns to normal.

As set forth in foregoing statement, the present invention makes it possible to eliminate the conventional transmission method through fuel flow control by the hydraulic valve, or by an electromagnetic valve, it disconnects the engine power with precision from the vehicle wheels during idle shift, and produces a braking effect during downgrade when the vehicle engine is rotating idly.

As is apparent from the foregoing specification, the present invention is suitable for being embodied in various alterations and modifications, which may differ particularly from those that have been described in the preceding specification and description. It should be understood that we wish to embody all such modifications as reasonably and properly being within the scope of the present invention, and as defined in the annexed claims.

What is claimed is:

1. A fully automatic vehicle power transmission system for a vehicle engine, comprising in combination
first and second annuli, a torque output shaft and a front output shaft pivoted to said first and second annuli, respectively, a centrifugal clutch lining and a drivable drum wheel set in series between said second annulus and said front output shaft a torque converter, a clutch pressure bearing plate couplable to said torque converter, a centrifugal weight controlling said clutch pressure plate and being coupled to said torque converter, a clutch spring, a clutch pressure plate, and a clutch lining connector set in serial order between said clutch pressure bearing plate and said centrifugal weight, a shifting gear couplable to said front output shaft, a rear output shaft couplable to said shifting gear, said centrifugal weight being drivable to urge said clutch pressure bearing plate to said clutch lining connector, thereby permitting power transmission from said vehicle engine through said torque converter and said first annulus for a first speed reduction, and further through said second annulus for a second speed reduction, so as to thereafter operate in a slow shift mode, said power transmission further passing through said front output shaft, and said shifting gear to said rear output shaft, said centrifugal clutch lining driving said second annulus into coupling engagement with said drivable drum wheel upon the revolving speed of said second annulus reaching a predetermined range so as to shift power to a fast shift mode, or alternatively so as to shift power to an intermediate shift mode when the revolving speed of said second annulus is below said predetermined range.

2. The fully automatic vehicle power transmission system as claimed in claim 1, further comprising a one-way output clutch connected to said front output shaft to prevent said front output shaft from transmitting power when said vehicle engine is stopped.

3. The fully automatic vehicle power transmission system as claimed in claim 1, further comprising a one-way brake clutch connected to said clutch lining connector to prevent the vehicle engine to rotate idly when the revolving speed of the vehicle engine is slower that that of said clutch lining connector.

* * * * *